US006765927B1

(12) United States Patent
Martin et al.

(10) Patent No.: US 6,765,927 B1
(45) Date of Patent: Jul. 20, 2004

(54) RSVP PROXY SERVICE FOR COMMUNICATION NETWORK

(75) Inventors: Christopher Martin, Apex, NC (US); D. Brian Edginton, West Jordan, UT (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/547,776

(22) Filed: Apr. 12, 2000

Related U.S. Application Data

(60) Provisional application No. 60/160,560, filed on Oct. 20, 1999.

(51) Int. Cl.[7] .......................... H04J 1/16; H04L 12/26; H04L 12/28; G06F 15/173
(52) U.S. Cl. .................. 370/469; 370/230; 370/351; 370/390; 370/410; 709/226; 709/240
(58) Field of Search ................. 370/351, 392, 370/389, 401, 408, 409, 410, 420, 463, 474, 475, 395, 431, 229, 230, 231; 709/200, 201, 202, 208, 217, 219, 225, 226, 227, 228, 229, 238, 239

(56) References Cited

U.S. PATENT DOCUMENTS

| | | | | | |
|---|---|---|---|---|---|
| 5,881,246 | A | * | 3/1999 | Crawley et al. | 395/200.68 |
| 5,903,735 | A | * | 5/1999 | Kiffer et al. | 709/240 |
| 6,021,263 | A | * | 2/2000 | Kujoory et al. | 370/409 |
| 6,031,841 | A | * | 2/2000 | Woundy | 370/410 |
| 6,058,113 | A | * | 5/2000 | Chang | 370/390 |
| 6,073,175 | A | * | 6/2000 | Tavs et al. | 709/226 |
| 6,101,549 | A | * | 8/2000 | Baugher et al. | 709/238 |
| 6,252,857 | B1 | * | 6/2001 | Fendick et al. | 370/408 |
| 6,286,052 | B1 | * | 9/2001 | McCloghrie et al. | 709/238 |
| 6,341,127 | B1 | * | 1/2002 | Katsube et al. | 370/352 |
| 6,343,326 | B2 | * | 1/2002 | Acharya et al. | 709/238 |
| 6,385,207 | B1 | * | 5/2002 | Woundy | 370/410 |
| 6,453,349 | B1 | * | 9/2002 | Kano et al. | 709/226 |
| 6,519,254 | B1 | * | 2/2003 | Chuah et al. | 370/389 |
| 6,567,857 | B1 | * | 5/2003 | Gupta et al. | 709/238 |
| 6,621,793 | B2 | * | 9/2003 | Widegren et al. | 370/230 |

OTHER PUBLICATIONS

Software Functional Specification, Resource Reservation Protocol (RSVP), 8 pages.
Moy, "OSPF Version 2," Mar. 1994, RFC 1583, p. 1–216.
Braden, et al., "Resource ReSerVation Protocol (RSVP)—Version 1 Functional Specification," Sep. 1997, RFC 2205, pp. 1–112.
Baker, et al., "RSVP Management Information Base using SMIv2," Sep. 1997, RFC 2206, pp. 1–64.
Braden, et al., "Resource ReSerVation Protocol (RSVP)—Version 1 Message Processing Rules," Sep. 1997, RFC 2209, pp. 1–25.
Wroclawski, "The Use of RSVP with IETF Integrated Services," Sep. 1997, RFC 2210, pp. 1–33.
Shenker, et al., "General Characterization Parameters for Integrated Service Network Elements", Sep. 1997, RFC 2215, pp. 1–16.
Wahl, et al., "Lightweight Directory Access Protocol (v3)", Dec. 1997, RFC 2251, pp. 1–50.
Moy, J., "OSPF Version 2," www.ietf.org/rfc/rfc1583.txt, pp. 1–216, Mar. 1994.

(List continued on next page.)

*Primary Examiner*—Man Phan
(74) *Attorney, Agent, or Firm*—Michael Blaine Brooks, P.C.; David A. Cordeiro; Andrew S. Nagelstad

(57) ABSTRACT

RSVP host proxy services for extending RSVP-signaled QoS provisioning to flows involving one or more RSVP-unaware hosts. In an RSVP sender host proxy service, a switch through which an RSVP-unaware source host accesses a network acts as an RSVP sender host proxy for the source host. In an RSVP receiver host proxy service, a switch through which an RSVP-unaware destination host accesses a network acts as an RSVP receiver host proxy for the destination host.

35 Claims, 7 Drawing Sheets

OTHER PUBLICATIONS

Braden, R., et al., "Resource ReSerVation Protocol (RSVP)—Version 1 Functional Specification," www.ietf.org/rfc/rfc2205.txt, pp. 1–112, Sep. 1997.

Baker, F., et al., "RSVP Management Information BAse Using SMIv2," www.ietf.org/rfc/rfc2206.txt. pp. 1–64, Sep. 1997.

Braden, R., et al., "Resource ReSerVation Protocol (RSVP)—Version 1 Message Processing Rules," www.ietf.org/rfc/rfc2209.txt, pp. 1–25, Sep. 1997.

Wroclawski, J., "The Use of RSVP with IETF Integrated Services," www.ietf.org/rfc/rfc2210.txt, pp. 1–33, Sep. 1997.

Shenker, S., et al., "General Characterization Parameters for Integrated service Network Elements," www.ietf.org/rfc/rfc2216.txt, pp. 1–16, Sep. 1997.

Wahl, M., et al., "Lightweight Directory Access Protocol (v3)," www.ietf.org/rfc/rfc2251.txt, pp. 1–50, Dec. 1997.

* cited by examiner

RSVP PROXY SERVICE FOR COMMUNICATION NETWORK

This application claims the benefit of U.S. provisional patent application serial No. 60/160,560 entitled "QUALITY OF SERVICE POLICY MANAGER", filed Oct. 20, 1999.

BACKGROUND OF THE INVENTION

Data communication switches are becoming more and more intelligent. Whereas legacy data communication switches provided indiscriminate first-in, first-out forwarding of packets, more recent data communication switches support differential packet forwarding based on flow characteristics under the Quality of Service (QoS) label. The trend toward QoS started first in cell-switched ATM networks, but has migrated to packet-switched networks and protocols, including bridging (Layer 2, or "L2"), routing (Layer 3, or "L3") and transport (Layer 4, or "L4") protocols.

Standardized QoS elements are emerging in packet switched networks. One standard element is a signaling protocol through which a QoS may be provisioned end-to-end for a flow. This signaling protocol is called the Resource Reservation Protocol (RSVP). In conventional RSVP-signaled QoS provisioning, an RSVP-aware source host, called a "sender", desiring to initiate a flow with an RSVP-aware destination host, called a "receiver", transmits downstream an RSVP Path message specifying parameters for a proposed flow. Switches along the flowpath review the RSVP Path message and modify certain message fields as required to indicate limitations and conditions on their ability to deliver QoS services to the flow. The RSVP-aware destination host receives the RSVP Path message and uses the information therein to generate and transmit an RSVP Resv message back upstream requesting the provisioning of a specific QoS for the flow at each switch along the flowpath. Each switch determines whether or not to accept the request based on whether the switch has sufficient available resources to provide the requested QoS and whether the flow is entitled to the requested QoS. If the reservation is accepted, the switches are configured to forward packets within the flow in accordance with the QoS. In this way, an RSVP-signaled QoS for the flow is provisioned end-to-end along the flowpath.

While standard RSVP-signaled QoS, as outlined above, provides a means for end-to-end QoS provisioning within a network, it is only known to be available for flows between hosts that are RSVP-aware. There is a need to extend the benefits of RSVP-signaled QoS to flows involving RSVP-unaware hosts.

SUMMARY OF THE INVENTION

The present invention provides RSVP host proxy services for extending RSVP-signaled QoS provisioning to flows involving hosts that are not RSVP-aware.

In accordance with an RSVP sender host proxy service, a switch through which a first host accesses a network acts as an RSVP sender host proxy for the first host. Upon receiving a data packet for a new flow from the first host, and determining that the RSVP sender host proxy service is enabled for the first host, the switch generates and transmits on a flowpath to a second host an RSVP Path message. In accordance with RSVP, the RSVP Path message prompts the second host to generate and return on the flowpath an RSVP Resv message.

In accordance with an RSVP receiver host proxy service, a switch through which a first host accesses a network acts as an RSVP receiver host proxy for the first host. Upon receiving an RSVP Path message generated and transmitted by a second host and determining that the RSVP receiver host proxy service is enabled for the first host, the switch generates and returns on a flowpath to the second host an RSVP Resv message.

A switch serving as an RSVP host proxy for a host may continue to act as an RSVP router for hosts.

These and other aspects of the inventions may be better understood by reference to the following detailed description taken in conjunction with the accompanying drawings briefly described below.

DETAILED DESCRIPTION OF THE PREFERRED EMBODIMENT

Figure 1:
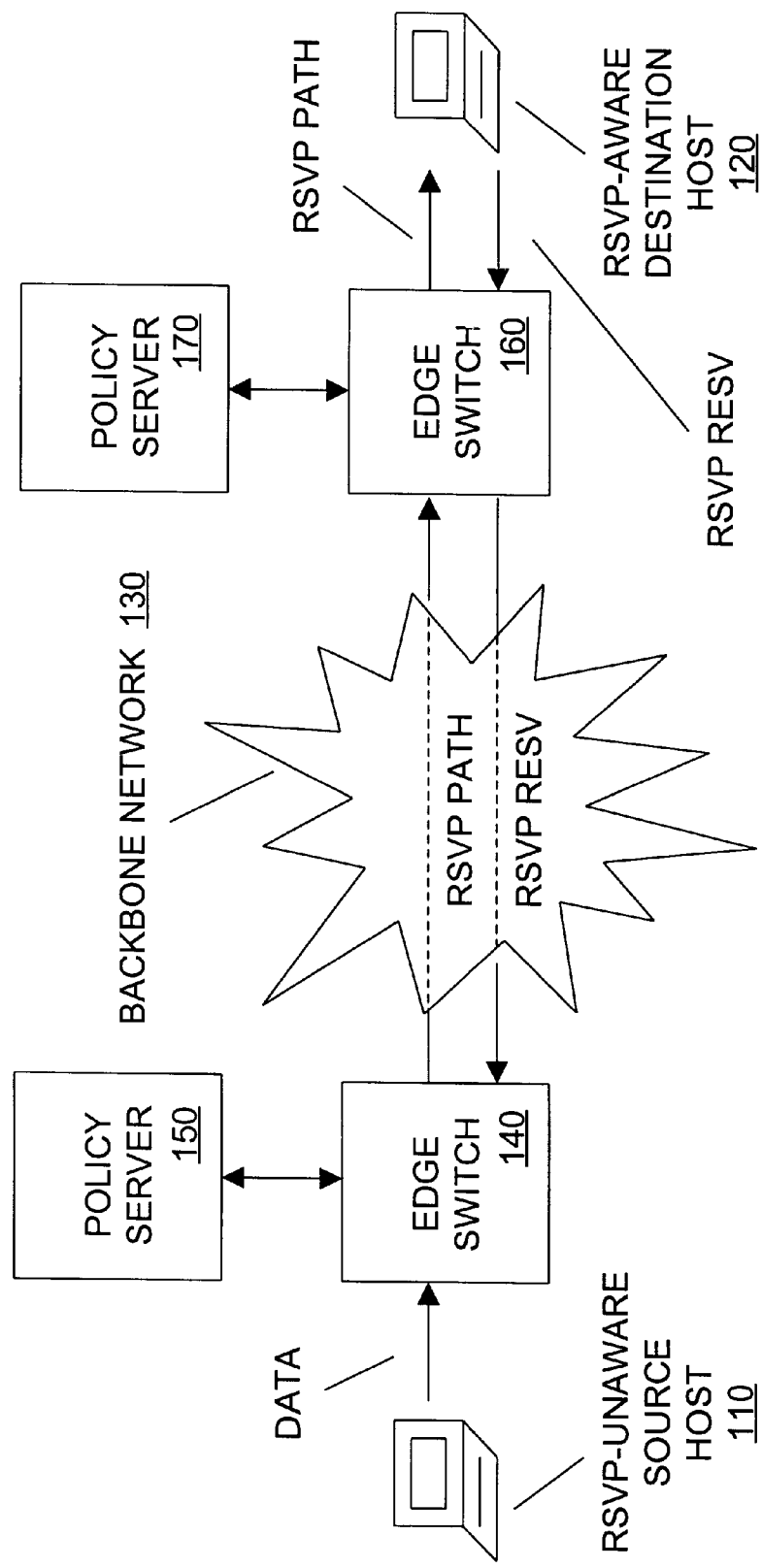
FIG. 1 illustrates a network in which an RSVP sender host proxy service is operative.

In FIG. 1, a network is shown in which a preferred RSVP sender host proxy service in accordance with the invention is operative. The network includes RSVP-unaware source host 110 having access to backbone network 130 via edge switch 140. Edge switch 140 is coupled to edge switch 160 across backbone network 130 via one or more core switches (not shown) operative in backbone network 130. Edge switch 160 is coupled to RSVP-aware destination host 120. Edge switches 140, 160 are also coupled to policy servers 150, 170, respectively.

Hosts 110, 120 are preferably network end-stations, such as PCs, workstations or servers, having respective network interfaces for packetized communication with other hosts via edge switches 140, 160, respectively. Edge switches 140, 160 are preferably gateway devices, such as hubs, bridges or routers, having a plurality of respective network interfaces for forwarding packetized communications originated by hosts. Policy servers 150, 170 retain quality of service (QoS) rules for application on edge switches 140, 160, respectively, based on flow characteristics. Hosts 110, 120, edge switches 140, 160 and policy servers 150, 170 may be interconnected via cables or other transmission media, and may support various data communication protocols, such as Ethernet, Internet Protocol (IP) and Asynchronous Transfer Mode (ATM). Edge switches 140, 160 preferably support the router function of Resource Reservation Protocol (RSVP) set forth in Internet Engineering Task Force Request for Comment 2205 entitled "Resource ReSerVation Protocol—Version 1 Functional Specification", September 1997 (hereinafter RFC 2205), incorporated herein by reference. Destination host 120 preferably supports the RSVP receiver host function set forth in RFC 2205; however, source host 110 does not support the RSVP sender host function set forth in RFC 2205. Instead, RSVP-signaled end-to-end QoS provisioning for data flows between source host 110 and destination host 120 is established through the expedient of an RSVP sender host proxy agent implemented on edge switch 140.

In its most basic feature, the RSVP sender host proxy service may be described with reference to FIG. 1. RSVP-unaware source host 110 initiates a data flow by transmitting a data packet on the transmission medium interconnecting source host 110 with edge switch 140, the data packet having an address of source host 110 as a source address and an address of destination host 120 as a destination address. Edge switch 140 receives the data packet, determines that the data packet meets RSVP sender host proxy criteria, generates an RSVP Path message in accordance with an RSVP sender host function, modifies certain fields of the RSVP Path message if required in accordance with an RSVP router function, and transmits the RSVP Path message on backbone network 130. The RSVP Path message traverses backbone network 130 and edge switch 160 along a flow-path between source host 110 and destination host 120, whereat certain fields of the message may be modified at each "hop" in accordance with the RSVP router function, and eventually arrives at RSVP-aware destination host 120. Destination host 120, in response to the RSVP Path message, generates an RSVP Resv message requesting a QoS reservation in accordance with the RSVP receiver host function and transmits the RSVP Resv message on the transmission medium interconnecting destination host 120 and edge switch 160. Edge switch 160 receives the RSVP Resv message and, in conjunction with policy server 170 and in accordance with the RSVP router function, determines whether or not to accept the reservation. The RSVP Resv message traverses backbone network 130 and edge switch 140 along the flowpath, whereat it is determined at each "hop" in accordance with the RSVP router function whether to accept the reservation, with edge switch 140 making the determination in conjunction with policy server 150.

Various elaborations of this basic RSVP sender host proxy service are possible as described hereinafter. Nevertheless, at a fundamental level, this basic proxy service, despite its apparent simplicity, is believed to confer a significant advance over the prior art by expanding the reach of RSVP-signaled QoS provisioning to flows involving source hosts that are RSVP-unaware.

Figure 2:
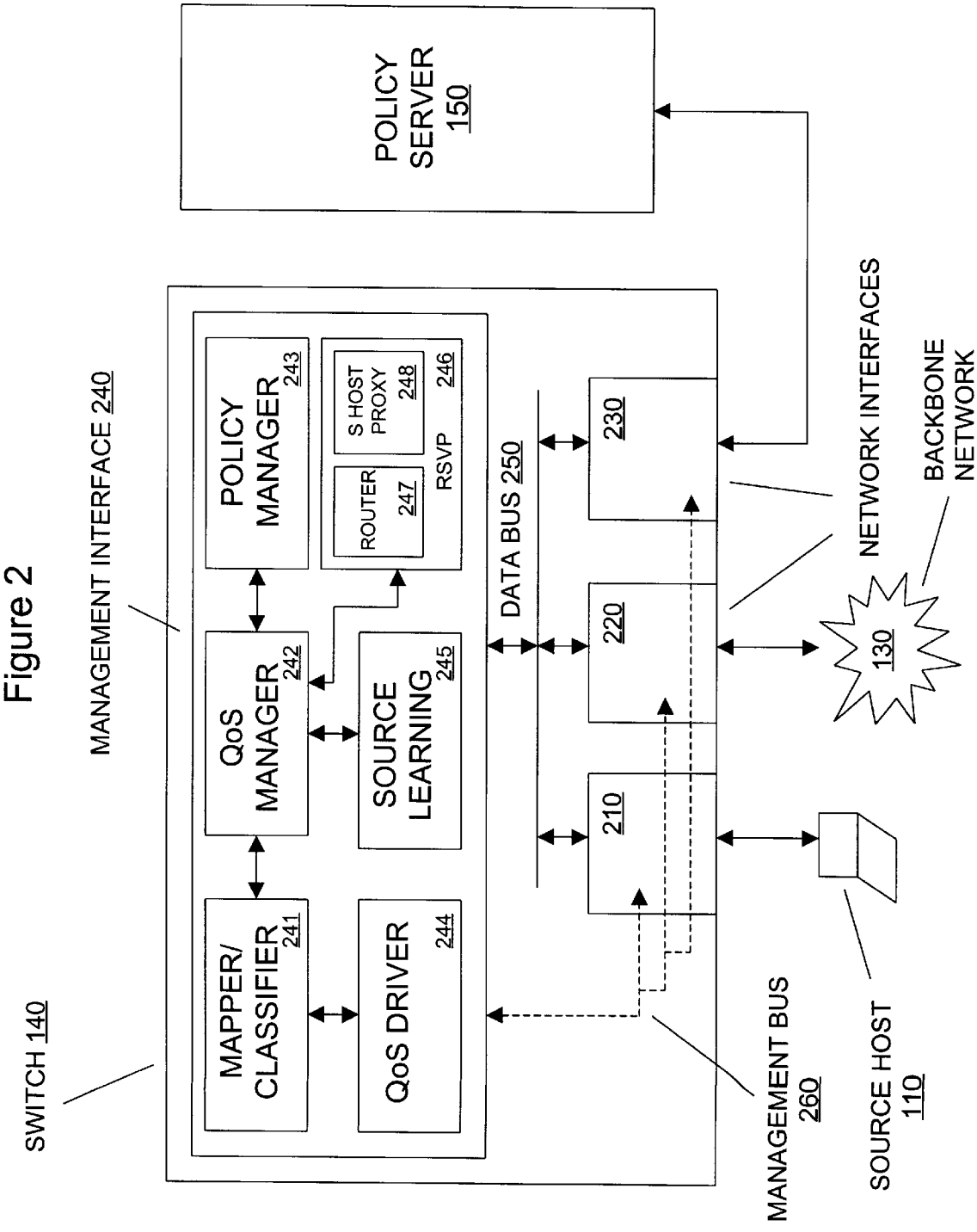
FIG. 2 illustrates a switch supporting an RSVP sender host proxy function in the network according to FIG. 1.

Turning now to FIG. 2 a preferred RSVP sender host proxy service will be described in even greater detail by reference to "on switch" processing on edge switch 140. Edge switch 140 has network interfaces 210, 220, 230 and management interface 240 linked by data bus 250. Network interfaces 210, 220, 230 interconnect RSVP-unaware source host 110, switches in backbone network 130 and policy server 150 over different interfaces. Management interface 240 supports various modules, including QoS mapper/classifier 241, QoS manager 242, policy manager 243, QoS driver 244, source learning 245 and RSVP 246. RSVP 246 includes RSVP router agent 247 and RSVP sender host proxy agent 248. Management interface 240 and network interfaces 210, 220, 230 are linked by management bus 260 for transmitting and receiving management information including QoS information for various flows.

Edge switch 140 supports RSVP processing as follows. RSVP message packets received on edge switch 140 are captured off data bus 250 by is management interface 240. RSVP message packets are forwarded to RSVP 246 for processing by RSVP routing agent 247 in accordance with the RSVP router function. RSVP router function processing of RSVP Path message packets includes modifying certain message fields as required to indicate limitations and conditions on the ability of edge switch 140 to deliver QoS services to the flow. RSVP router function processing of RSVP Resv message packets includes determining whether or not to accept requested QoS reservations based on whether edge switch 140 has sufficient available resources to provide the requested QoS and whether the flows in question are entitled to the requested QoS. The determination of whether or not to accept QoS reservations is made in concert with QoS manager 242 and policy manager 243. Rules defining applicable QoS limitations and conditions are "pulled down" to policy manager 243 from policy server 150 and applied in the determination. RSVP router function forwards RSVP Path message packets, including any modifications, to the "next hops" in the network, and forwards RSVP Resv message packets, including any modifications, to the "previous hops" in the network.

QoS manager 242 facilitates QoS establishment on edge switch 140 in accordance with accepted QoS reservations. For flows for which reservations have been accepted, QoS manager 242 receives from policy manager 243 QoS policies, divides the QoS policies into flow identifier and QoS parts and forwards the parts to the QoS mapper/classifier 241. Mapper/classifier 241 associates the flow identifiers with queues supporting the QoS and forwards the associations to QoS driver 244, which establishes flow identifier/queue associations on network interfaces 210, 220, 230 via management bus 260 to implement the QoS policies on edge switch 140.

In addition to the RSVP processing described above, edge switch 140 supports a novel RSVP sender host proxy function as follows. Data packets received on edge switch 140 and having unknown source addresses are captured off data bus 250 by management interface 240. Unknown source address data packets are forwarded to source learning 245 for establishing associations on edge switch 140 between the source addresses and the network interfaces on which the source addresses arrived. Unknown source address data packets are also forwarded to QoS manager 242 to determine whether the RSVP sender host proxy function is enabled for the sources in question. Where enabled, unknown source address packets are forwarded to RSVP sender host proxy agent 248 for processing in accordance with an RSVP sender host function. RSVP sender host function processing includes generating RSVP Path message packets specifying parameters for the flows in question and forwarding RSVP Path message packets for processing by RSVP routing agent 247 in accordance with the RSVP router function as described earlier.

Figure 3A:
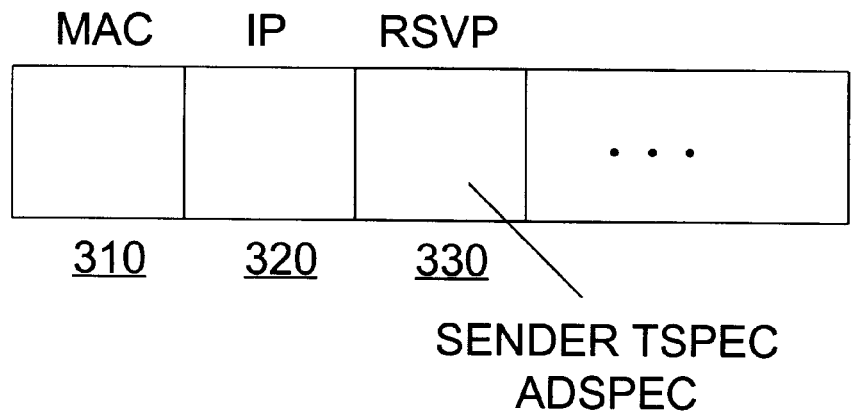
FIG. 3a illustrates the general format for a packet including an RSVP Path message.

Turning to FIG. 3a, the general format of an RSVP Path message packet is shown. The format and content of such a packet is well known and described in RFC 2205. Generally such a packet generally includes a Layer 2 header 310 followed by a Layer 3 header 320 and RSVP Path message 330. Layer 2 header 310 includes source and destination addressing information. Layer 3 header 320 is generally an IP header including source and destination addressing information and specifying protocol number "46". RSVP Path message 330 includes an RSVP common header identifying the message as a Path message and an RSVP object including the contents of the Path message. The contents of the Path message include a Sender TSPEC describing the flow the sender expects to generate and an ADSPEC. The Sender TSPEC traverses the flowpath from the RSVP sender to the RSVP receiver without modification, whereas the ADSPEC may be modified by switches along the flowpath to indicate the availability of QoS control services and parameters required for QoS control services to operate correctly.

Figure 3B:
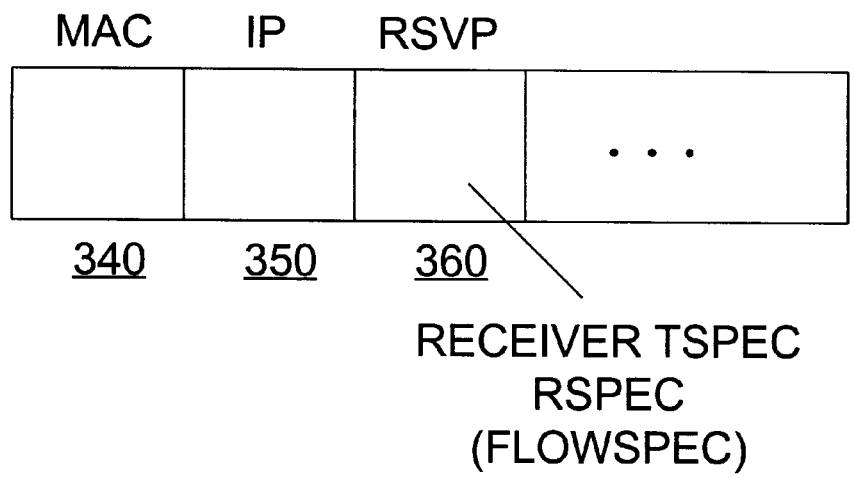
FIG. 3b illustrates the general format for a packet including an RSVP Resv message.

Turning to FIG. 3b, the general format of an RSVP Resv message packet is shown. The format and content of such a packet is well known and described in RFC 2205. Generally such a packet generally includes a Layer 2 header 340 followed by a Layer 3 header 350 and RSVP Resv message 360. Layer 2 header 340 includes source and destination addressing information. Layer 3 header 340 is generally an IP header including source and destination addressing information and specifying protocol number "46". The RSVP Path message 350 includes an RSVP common header identifying the message as a Resv message and an RSVP object including the contents of the Resv message. The contents of the Resv message include a requested QoS control service, a Receiver TSPEC describing the flow for which resources should be reserved and, if indicated by the requested QoS control service, a Receiver RSPEC describing the level of service being requested. The contents together form a FLOWSPEC that traverses the flowpath from the RSVP receiver to the RSVP sender and may be modified by switches along the flowpath.

Figure 4:
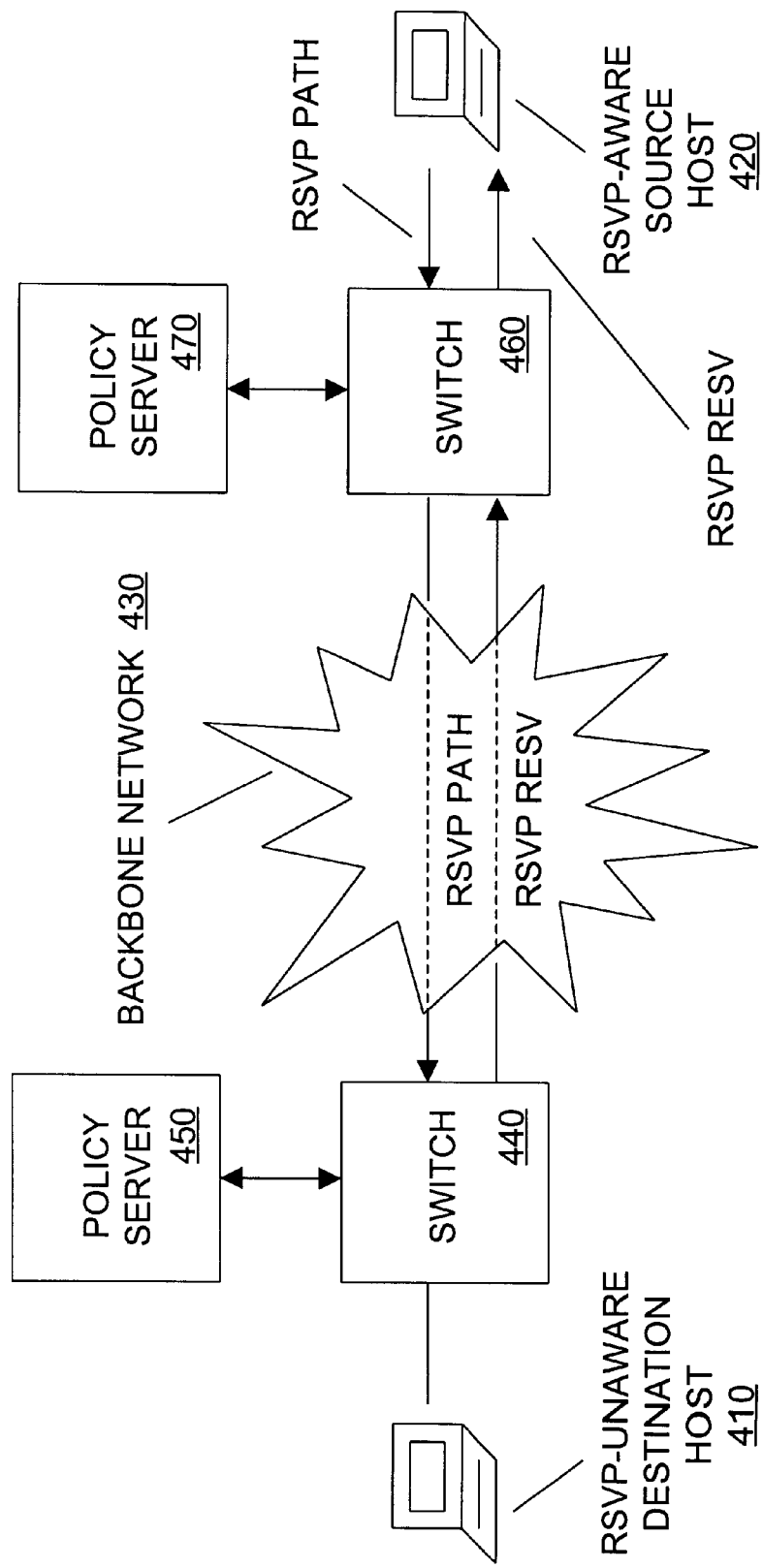
FIG. 4 illustrates a network in which an RSVP receiver host proxy service is operative.

Turning now to FIG. 4, a network is shown in which a preferred RSVP receiver host proxy service in accordance with the invention is operative. The network includes an RSVP-unaware destination host 410 having access to backbone network 430 via edge switch 440. Edge switch 440 is coupled to edge switch 460 via one or more core switches (not shown) in backbone network 430. Edge switch 460 is coupled to RSVP-aware source host 420. Edge switches 440, 460 are also coupled to policy servers 450, 470, respectively.

Hosts 410, 420 are preferably network end-stations, such as PCs, workstations or servers, having respective network interfaces for packetized communication with other hosts via edge switches 440, 460, respectively. Edge switches 440, 460 are preferably gateway devices, such as hubs, bridges or routers, having a plurality of respective network interfaces for forwarding packetized communications originated by hosts. Policy servers 450, 470 retain quality of service (QoS) rules for application on switches 440, 460, respectively, based on flow characteristics. Hosts 410, 420, switches 440, 460 and policy servers 450, 470 may be interconnected via cables or other transmission media, and may support various protocols, such as Ethernet, IP and ATM. Edge switches 440, 460 preferably support the RSVP router function set forth in RFC 2205. Source host 420 preferably supports the RSVP sender host function set forth in RFC 2205; however, destination host 410 does not support the RSVP receiver host function set forth in RFC 2205. Consequently, end-to-end QoS provisioning for data flows between source host 420 and destination host 410 is established through the expedient of an RSVP receiver host proxy agent implemented on edge switch 440.

In its most basic feature, the RSVP receiver host proxy service may be described with reference to FIG. 4. RSVP-aware source host 420 generates in accordance with the RSVP sender host function an RSVP Path message having an address of RSVP-unaware destination host 410 as a destination address and transmits the RSVP Path message on the transmission medium interconnecting source host 420 with switch 460. Switch 460 receives the RSVP Path message, modifies certain fields of the message if required in accordance with the RSVP router function, and transmits the RSVP Path message on backbone network 430. The RSVP Path message traverses switches along the flowpath in backbone network 430 hop-by-hop whereat certain fields of the message may be modified in accordance with the RSVP router function, and eventually arrives at switch 440. Switch 440 modifies certain fields of the message in accordance with the RSVP router function, determines that the RSVP Path message packet meets RSVP receiver host proxy criteria, and generates in response an RSVP Resv message in accordance with the RSVP receiver host function. Switch 440 determines, in conjunction with policy server 450 and in accordance with the RSVP router function, whether to accept the reservation itself prior to transmitting the RSVP Resv message back up the flowpath on backbone network 430. The RSVP Resv message traverses switches in backbone network 430 and switch 460, whereat it is determined hop-by-hop in accordance with the RSVP router function whether to accept the reservation, with switch 460 making the determination in conjunction with policy server 470.

Various elaborations of this basic RSVP receiver host proxy service are possible as described hereinafter. Nevertheless, at a fundamental level, this basic proxy service, despite its apparent simplicity, is believed to confer a significant advance over the prior art by expanding the reach of RSVP to allow end-to-end QoS provisioning for flows involving a destination host that is RSVP-unaware.

Figure 5:
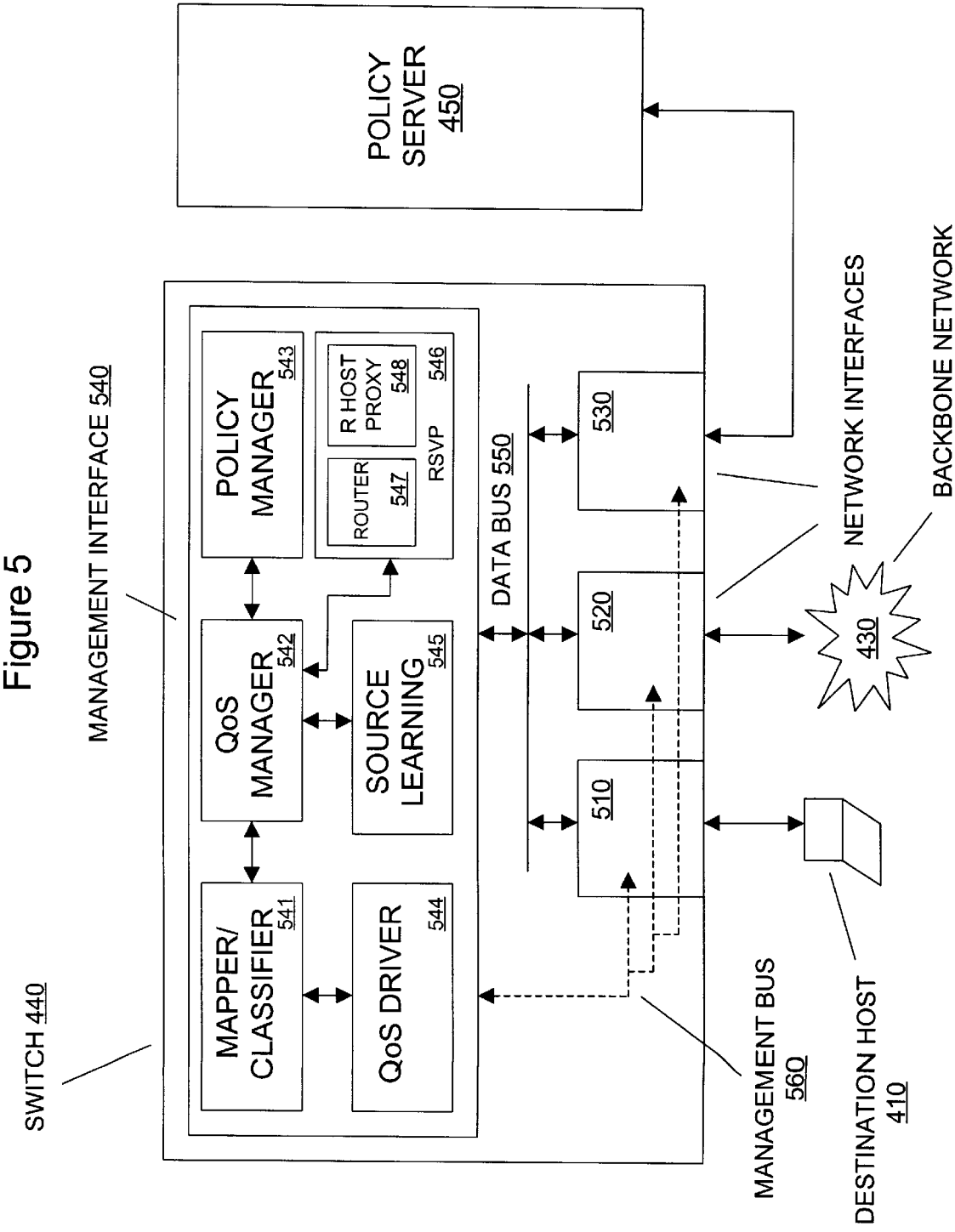
FIG. 5 illustrates a switch supporting an RSVP receiver host proxy function in the network according to FIG. 4.

Turning now to FIG. 5 a preferred RSVP receiver host proxy service will be described in greater detail by reference to "on switch" processing on edge switch 440. Switch 440 has network interfaces 510, 520, 530 and management interface 540 linked by data bus 550. Network interfaces 510, 520, 530 interconnect destination host 410, switches in backbone network 430 and policy server 450 over different interfaces. Management interface 540 supports various modules, including QoS mapper/classifier 541, QoS manager 542, policy manager 543, QoS driver 544, source learning 545 and RSVP 546. RSVP 546 includes an RSVP router agent 547 and an RSVP receiver host proxy agent 548. Management interface 540 and network interfaces 510, 520, 530 are linked by management bus 560 for transmitting and receiving management information including QoS information for various flows.

Switch 440 supports RSVP processing as follows. RSVP message packets received on switch 440 are captured off data bus 550 by management interface 540. RSVP message packets are forwarded to RSVP 546 for processing by RSVP routing agent 547 in accordance with the RSVP router function, subject to exceptions specified herein. In the case of RSVP Path message packets, RSVP router function processing includes modifying certain fields in the Path message as required to indicate limitations and conditions on the ability of switch 440 to deliver QoS services to the flow. In the case of RSVP Resv message packets, RSVP router function processing includes determining whether or not to accept requested QoS reservations based on whether switch 440 has sufficient available resources to provide the requested QoS and whether the flows in question are entitled to the requested QoS. The determination of whether or not to accept QoS reservations is made in concert with QoS manager 542 and policy manager 543. Rules defining applicable QoS limitations and conditions are "pulled down" to policy manager 543 from policy server 450 and applied in the determination. RSVP router function forwards RSVP Resv message packets, including any modifications, to the "previous hops" in the network. RSVP router function also forwards RSVP Path message packets, including any modifications, to the "next hops" in the network, except where the RSVP receiver host proxy function is enabled for the destinations in question. Where enabled, RSVP Path messages are not forwarded to the "next hops" in the network.

In addition to the RSVP processing described above, switch 440 supports a novel RSVP receiver host proxy function as follows. RSVP Path message packets are forwarded to QoS manager 542 to determine whether the RSVP receiver host proxy function is enabled for the destinations in question. Where enabled, RSVP Path message packets are forwarded to RSVP receiver host proxy agent 548 for processing in accordance with an RSVP receiver host function. RSVP receiver host function includes generating RSVP Resv message packets in response to the RSVP Path message packets and forwarding the RSVP Resv message packets for processing by RSVP routing agent 547 in accordance with the RSVP router function as described earlier.

Figure 6:
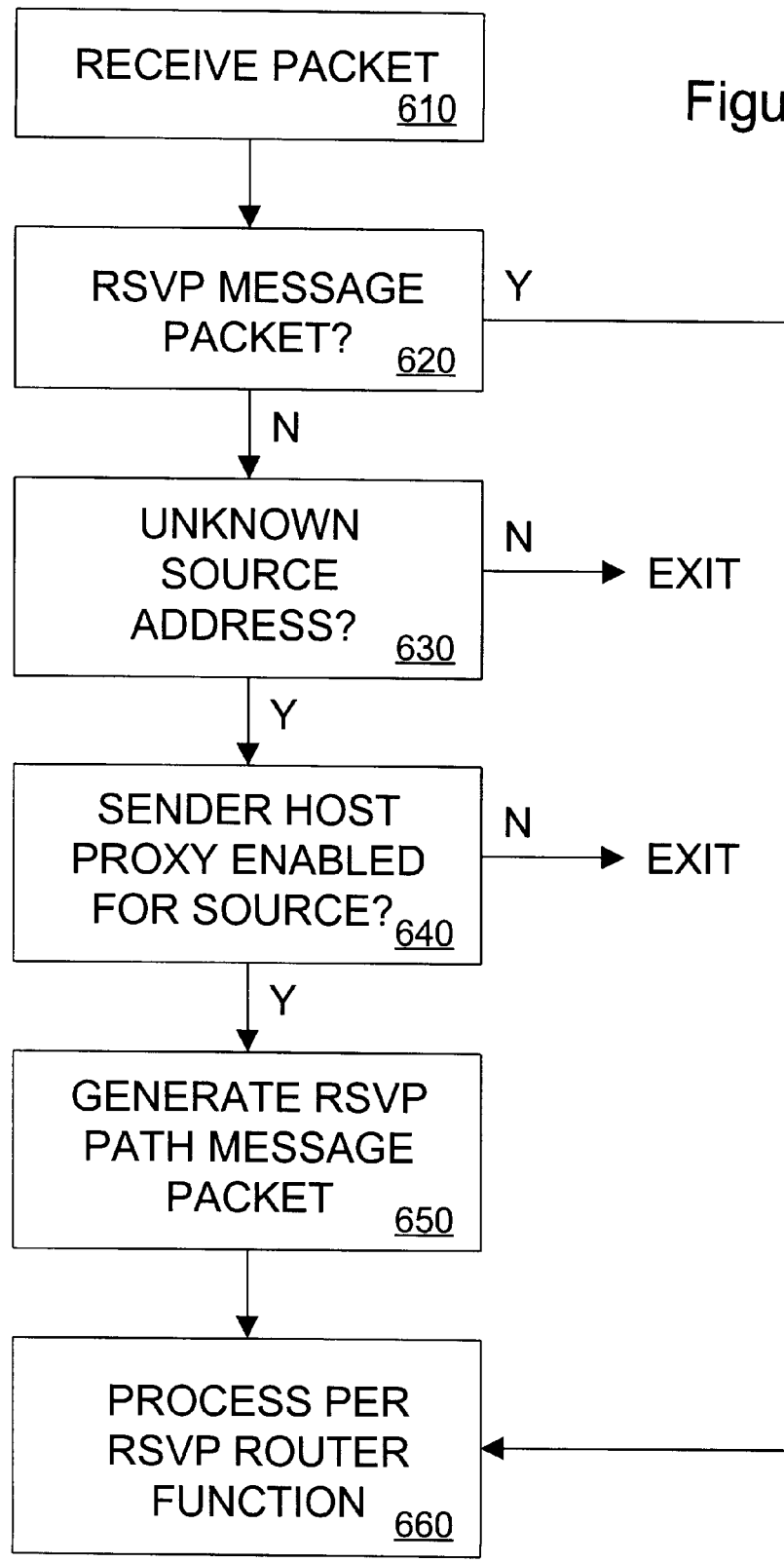
FIG. 6 is a flow diagram describing RSVP packet handling on a switch supporting an RSVP sender host proxy function in accordance with a preferred embodiment of the invention.

In FIG. 6, a flow diagram illustrates RSVP packet handling on a switch supporting an RSVP sender host proxy function in accordance with a preferred embodiment of the invention. A packet is received on the switch (610) and a determination is made whether the packet is an RSVP message packet (620). If the packet is an RSVP message packet, the packet is processed in accordance with the RSVP router function (660). If the packet is not an RSVP message packet, a determination is made whether the packet has a source address that is unknown to the switch, indicating a new flow for which a QoS has not yet been provisioned (630). If the packet has an unknown source address, a determination is made whether the RSVP sender host proxy service is enabled for the source (640). If the RSVP sender proxy service is enabled for the source, an RSVP Path message packet is generated (650). The RSVP Path message is processed by the switch in accordance with the RSVP router function (660). If, however, the source address is known to the switch (per the determination in Step 630), or if the RSVP sender host proxy service is not enabled for the source (per the determination in Step 640), RSVP processing of the received packet is terminated.

Figure 7:
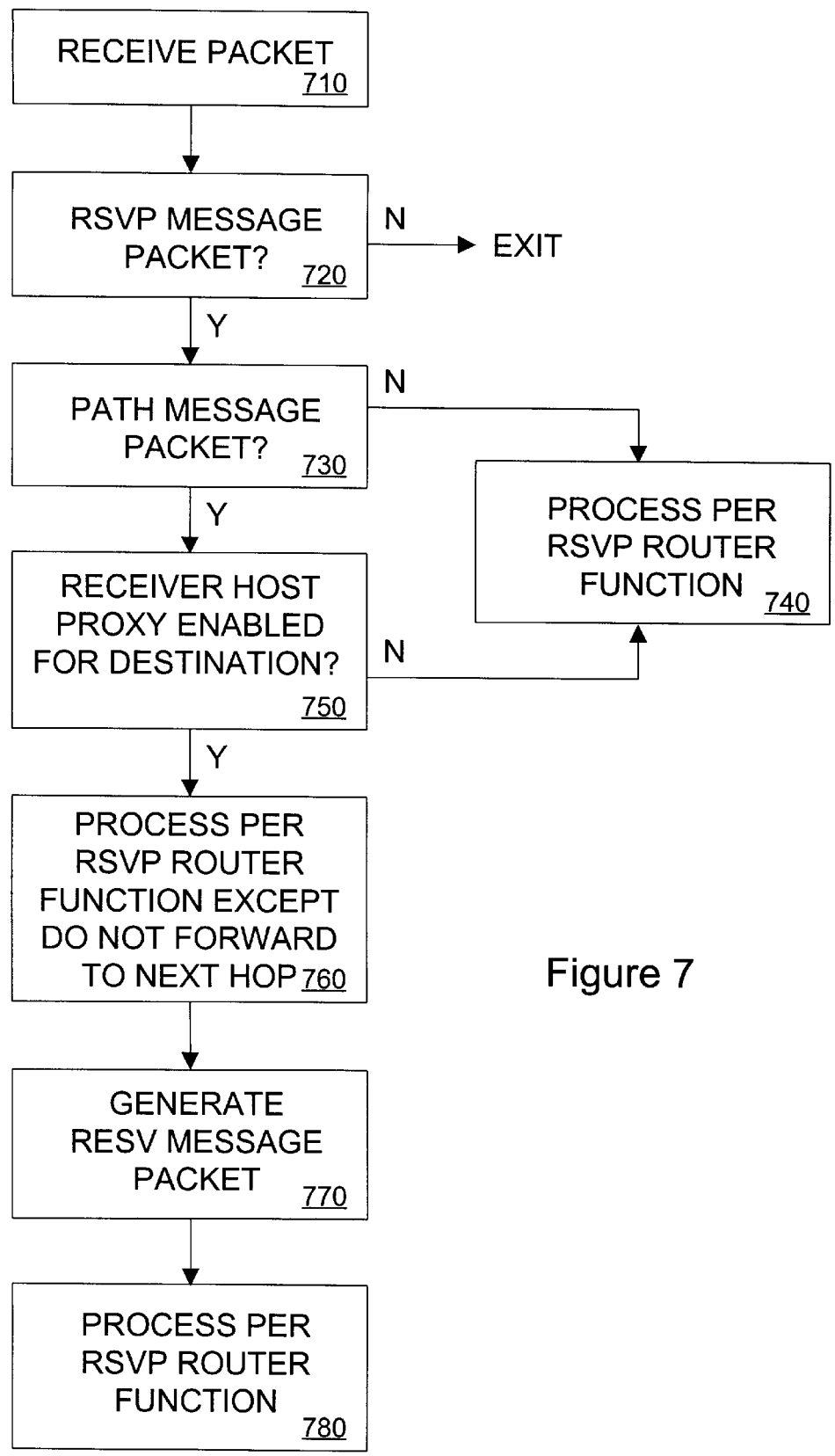
FIG. 7 is a flow diagram describing RSVP packet handling on a switch supporting an RSVP receiver host proxy function in accordance with a preferred embodiment of the invention.

In FIG. 7, a flow diagram illustrates RSVP packet handling on a switch supporting an RSVP receiver host proxy function in accordance with a preferred embodiment of the invention. A packet is received on the switch (710) and a determination is made whether the packet is an RSVP message packet (720). If the packet is an RSVP message packet, a determination is made whether the packet is an RSVP Path message packet (730). If the packet is not an RSVP Path message packet, RSVP processing of the received packet proceeds in accordance with the RSVP router function (740). If the packet is an RSVP Path message packet, however, a determination is made whether the RSVP receiver host proxy service is enabled for the destination (750). If the RSVP receiver host proxy service is not enabled for the destination, RSVP processing of the received packet proceeds in accordance with the RSVP router function (740). If the RSVP receiver host proxy service is enabled for the destination, however, RSVP processing of the received packet proceeds in accordance with the RSVP router function except the Path message is not forwarded by the switch to the "next hop" in the network (760), and an RSVP Resv message packet is generated (770). The RSVP Resv message is processed by the switch in accordance with the RSVP router function (780).

It will be appreciated by those of ordinary skill in the art that the invention can be embodied in other specific forms without departing from the spirit or essential character hereof. For instance, while the illustrated embodiments describe RSVP proxy-signaled end-to-end QoS provisioning for unicast flows between a source host and a single destination host, the invention may be applied to multicast flows between a source host and multiple destination hosts, wherein one or more switches act as RSVP host proxies for the source host and/or one or more of the destination hosts. The present description is therefore considered in all respects illustrative and not restrictive. The scope of the invention is indicated by the appended claims, and all changes that come within the meaning and range of equivalents thereof are intended to be embraced therein.

We claim:

1. A Resource Reservation Protocol (RSVP) proxy method for a communication network having a plurality of nodes, the method comprising:

generating a data packet on a first node, the first node comprising a host that is not configured for RSVP;

transmitting the data packet to a second node, the second node comprising a switch capable of being configured as an RSVP proxy;

determining on the second node, in response to the data packet, whether the second node is an RSVP proxy for the first node based upon a source address in the data packet;

generating an RSVP Path message on the second node in response to the determination; and transmitting the RSVP Path message to a third node.

2. A Resource Reservation Protocol (RSVP) proxy method for a communication network having a plurality of nodes, the method comprising:

generating an RSVP Path message on a first node;

transmitting the RSVP Path message to a second node, the second node comprising a switch capable of being configured as an RSVP proxy;

determining on the second node in response to the RSVP Path message and based upon a destination address in the RSVP Path message whether the second node is an RSVP proxy for a third node, the third node comprising a host that is not configured for RSVP;

generating an RSVP Resv message on the second node in response to the determination; and transmitting the RSVP Resv message to the first node.

3. An RSVP proxy method for a communication network having a plurality of hosts and a switch, the method comprising:

transmitting a data packet from a first host to a switch;

originating an RSVP Path message on the switch in response to the data packet if the switch is an RSVP proxy for the first host contingent upon a source address in the data packet;

transmitting the RSVP Path message from the switch to a second host; and transmitting an RSVP Resv message from the second host to the switch in response to the RSVP Path message.

4. The method according to claim 3, wherein the first host is RSVP-unaware.

5. The method according to claim 3, further comprising reserving resources along a flowpath between the second host and the switch in response to the RSVP Resv message.

6. An RSVP proxy method for a communication network having a plurality of nodes, the method comprising:

transmitting an RSVP Path message from a first host to a switch;

originating an RSVP Resv message on the switch in response to the RSVP Path message and based upon a destination address in the RSVP Path message; and transmitting the RSVP Resv message from the switch to the first host.

7. The method according to claim 6, wherein the first host is RSVP-unaware.

8. The method according to claim 7, further comprising reserving resources along a flowpath between the first host and the switch in response to the RSVP Resv message.

9. An RSVP proxy service for a communication network, comprising:

a host for transmitting a data packet;

an edge switch for receiving the data packet from the host; and an RSVP host proxy agent on the edge switch for generating and transmitting to a backbone network, in response to the data packet and based upon a media access control source address in the data packet, an RSVP Path message.

10. An RSVP proxy service for a communication network, comprising:

a host for transmitting an RSVP Path message;

an edge switch for receiving the RSVP Path message from a backbone network; and an RSVP host proxy agent on the edge switch for generating and transmitting to the backbone network, in response to the RSVP Path message and based upon a destination address in the RSVP Path message, an RSVP Resv message.

11. An RSVP proxy service for a communication network, comprising:

a host connected to an edge switch, the edge switch managing the flow of data packets from the host to a backbone network; and wherein the edge switch receives a data packet from the host and in response and contingent upon a source address in the data packet generates and transmits an RSVP Path message on the backbone network.

12. An RSVP proxy service for a communication network, comprising:

a host connected to an edge switch, the edge switch managing the flow of data packets from the host to a backbone network; and wherein the edge switch receives an RSVP Path message destined for the host from the backbone network and in response to and contingent upon a destination address in the RSVP Path message generates and transmits an RSVP Resv message on the backbone network.

13. An RSVP proxy service for a communication network, comprising:

a first node connected to a second node, wherein the first node comprises a host and the second node comprises a switch, the second node providing an interface between the first node and a backbone network; and wherein the second node receives a data packet from the first node and in response to and contingent upon a source address in the data packet generates and transmits an RSVP Path message on the backbone network.

14. An RSVP proxy service for a communication network, comprising:

a first node connected to a second node, wherein the first node comprises a host and the second node comprises a switch, the second node providing an interface between the first node and a backbone network; and wherein the second node receives an RSVP Path message destined for the first node from the backbone network and in response to and contingent upon a destination address in the RSVP Path message generates and transmits an RSVP Resv message on the backbone network.

15. A signaling method for establishing an end-to-end Quality of Service (QoS) for a data flow in a communication network utilizing a signaling proxy, the method comprising:

generating a data packet on a first node, the first node comprising a host that is not configured for QoS signaling;

transmitting the data packet to a second node, the second node comprising a switch capable of being configured as a QoS signaling proxy;

determining on the second node in response to the data packet and contingent upon a source address of the data packet whether the second node is a QoS signaling proxy for the first node;

generating a QoS message on the second node in response to the determination; and transmitting the QoS message to a third node.

16. The method of claim 15, wherein the QoS message specifies parameters for a data flow.

17. The method of claim 15, wherein the QoS message is modified in route to the third node.

18. A signaling method for establishing an end-to-end Quality of Service (QoS) for a data flow in a communication network utilizing a signaling proxy, the method comprising:

generating a first QoS message on a first node;

transmitting the first QoS message to a second node, the second node comprising a switch capable of being configured as a QoS signaling proxy;

determining on the second node in response to the first QoS message and based upon a destination address in the first QoS message whether the second node is a QoS signaling proxy for a third node, the third node comprising a host that is not configured for QoS signaling;

generating a second QoS message on the second node in response to the determination; and transmitting the second QoS message to the first node.

19. The method of claim 18, wherein the first QoS message specifies parameters for a data flow.

20. The method of claim 18, wherein the first QoS message is modified in route to the second node.

21. The method of claim 18, wherein the second QoS message requests establishment of a QoS for a data flow.

22. The method of claim 18, wherein a QoS is established for a data flow at nodes along a flowpath between the second node and the first node in response to the second QoS message.

23. A service for establishing end-to-end QoS in a communication network, comprising:

a host connected to an edge switch, the edge switch managing the flow of data packets from the host to a backbone network; and wherein the edge switch receives a data packet from the host and in response and based upon a source address in the data packet generates and transmits a QoS message on the backbone network.

24. The service according to claim 23, wherein the QoS message specifics parameters for a data flow.

25. A service for establishing end-to-end QoS in a communication network, comprising:

a host connected to an edge switch, the edge switch managing the flow of data packets from the host to a backbone network; and wherein the edge switch receives a first QoS message destined for the host from the backbone network and in response to and based upon a destination address in the first QoS message generates and transmits a second QoS message on the backbone network.

26. The service according to claim 25, wherein the first QoS message specifies parameters for a data flow.

27. The service according to claim 25, wherein the second QoS message requests establishment of a QoS for a data flow.

28. The method of claim 1, wherein the second node is on a flow path of the data flow between the first node and the third node.

29. The method of claim 2, wherein the second node is on a flow path of a data flow between the first node and the third node.

30. The method of claims 15, wherein the second node is on a flow path of a data flow between the first node and the third node.

31. The method of claim 18, wherein the second node is on a flow path of a data flow between the first node and the third node.

32. A gateway device operatively coupled in the data path between a first host that is Resource Reservation Protocol (RSVP)-unaware and a second host, the gateway device comprising:

a network interface for receiving, from the first host, a data packet comprising a source address of the first host and a destination address of the second host;

a quality of service manager for determining whether the gateway device is an RSVP proxy for the first host based upon the source address; and an RSVP sender host proxy agent for, if the gateway device is an RSVP proxy for the first host:
generating an RSVP Path message; and
transmitting the RSVP Path message to the second host.

33. A method, internally performed by a gateway device in the data path between a first host that is Resource Reservation Protocol (RSVP)-unaware and a second host, of performing Resource Reservation Protocol (RSVP)-proxy services, the method comprising the steps of:

receiving, from the first host, a data packet comprising a source address of the first host and a destination address of a second host;

determining whether the gateway device is an RSVP proxy for the first host based upon the source address; and if the gateway device is an RSVP proxy for the first host:
generating an RSVP Path message; and
transmitting the RSVP Path message to the second host.

34. A gateway device operative coupled in the data path between a first host that is Resource Reservation Protocol (RSVP)-unaware and a second host, the gateway device comprising:

a network interface for receiving, from a second host, an RSVP Path message comprising a source address of the second host, a destination address of the first host, and traffic specification;

a quality of service manager for:
determining whether the gateway device is an RSVP proxy for the first host based upon the destination address; and
attempting to reserve the resources defined by the traffic specification; and an RSVP receiver host proxy agent for, if the gateway device is an RSVP proxy for the first node and the attempt to reserve the resources successful:
generating an RSVP Resv message to confirm the reservation of the resources; and
transmitting the RSVP Resv message to the second host.

35. A method, internally performed by a gateway device operative coupled in the data path between a first host that is Resource Reservation Protocol (RSVP)-unaware and a second host, of performing Resource Reservation Protocol (RSVP)-proxy services, the method comprising the steps of:

receiving, from a second host, an RSVP Path message comprising a source address of the second host, a destination address of the first host, and traffic specification;

determining whether the gateway device is an RSVP proxy for the first host based upon the destination address; and attempting to reserve the resources defined by the traffic specification; and if the gateway device is an RSVP proxy for the first node and the attempt to reserve the resources successful:
generating an RSVP Resv message to confirm the reservation of the resources; and
transmitting the RSVP Resv message to the second host.

* * * * *